US012717336B2

(12) United States Patent
Fuji

(10) Patent No.: US 12,717,336 B2
(45) Date of Patent: Aug. 25, 2026

(54) TRAVEL CONTROL SYSTEM FOR VEHICLE

(71) Applicant: SUBARU CORPORATION, Tokyo (JP)

(72) Inventor: Kei Fuji, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 19/218,782

(22) Filed: May 27, 2025

(65) Prior Publication Data

US 2025/0383660 A1 Dec. 18, 2025

(30) Foreign Application Priority Data

Jun. 18, 2024 (JP) ................................ 2024-097975

(51) Int. Cl.

| | |
|---|---|
| ***G05D 1/227*** | (2024.01) |
| ***G05D 1/617*** | (2024.01) |
| ***G05D 1/86*** | (2024.01) |
| ***G05D 109/10*** | (2024.01) |
| ***H04L 9/40*** | (2022.01) |
| ***H04W 4/48*** | (2018.01) |

(52) U.S. Cl.

CPC ........... *G05D 1/2274* (2024.01); *G05D 1/617* (2024.01); *G05D 1/86* (2024.01); *H04L 63/1416* (2013.01); *H04W 4/48* (2018.02); *G05D 2109/10* (2024.01)

(58) Field of Classification Search

CPC ........ G05D 1/2274; G05D 1/617; G05D 1/86; G05D 2109/10; H04W 4/48; H04L 63/1416

See application file for complete search history.

(56) References Cited

U.S. PATENT DOCUMENTS

2019/0312895 A1 10/2019 Fujimura et al.
2023/0208859 A1 6/2023 Hirano et al.

FOREIGN PATENT DOCUMENTS

JP 2018-111468 A 7/2018
WO 2022/049637 A1 3/2022

*Primary Examiner* — Andrew J Cromer

(74) *Attorney, Agent, or Firm* — Rimon P.C.

(57) ABSTRACT

A travel control system for a vehicle includes: a plurality of processors mounted on the vehicle; a determination processor mounted on the vehicle; an in-vehicle communication network; and a control device configured to establish wireless communication with the vehicle through a network environment and including a backup processor. The determination processor takes a count of unconformities between a sender identifier and a recipient identifier of the control information transmitted and received by the processors through the in-vehicle communication network. When the count of unconformities becomes larger than a predetermined threshold value, the determination processor determines that an abnormality is present, and transmits an abnormality signal to the control device through the network environment. Upon receiving the abnormality signal, the control device transmits the control information held by the backup processor, to the vehicle through the network environment, and makes a remote control of the vehicle.

6 Claims, 6 Drawing Sheets

TRAVEL CONTROL SYSTEM FOR VEHICLE

CROSS-REFERENCE TO RELATED APPLICATIONS

The present application claims priority from Japanese Patent Application No. 2024-097975 filed on Jun. 18, 2024, the entire contents of which are hereby incorporated by reference.

BACKGROUND

The disclosure relates to a travel control system for a vehicle configured to cope with unauthorized access from outside.

In recent years, vehicles such as automobiles include a vehicle control device including a plurality of ECUs (Electronic Control Units). Vehicles are subjected to various controls by the ECUs based on predetermined programs. Vehicles also include an in-vehicle communication network such as a CAN (Controller Area Network) that couples the ECUs together. The ECUs are communicatably coupled to one another through the in-vehicle communication network. Moreover, vehicles such as so-called connected cars have emerged. Connected cars are coupled by wireless communication to a communication center and a network environment, to transmit or receive data regarding a state of the subject vehicle and a situation of the surroundings to and from the communication center through the network environment.

Vehicles coupled to the network environment need a security system to suppress unauthorized access, etc. from outside to the in-vehicle communication network to which the ECUs are coupled. For example, Japanese Unexamined Patent Application Publication (JP-A) No. 2018-111468 discloses a technique of an in-vehicle communication network system in which a security ECU determines whether a frame transmitted from an ECU is unauthorized in accordance with a rule held in advance. For example, International Patent Application Publication WO 2022/049637 discloses a vehicle remote control system in which an abnormality monitoring device collects a control log of a vehicle and an operation log of an operator, compares them, and determines whether an abnormality has been caused by a cyber-attack or whether an abnormality has been caused by an abnormal operation by the operator.

SUMMARY

An aspect of the disclosure provides a travel control system for a vehicle. The travel control system includes a plurality of processors, a determination processor, an in-vehicle communication network, and a control device. The processors are mounted on the vehicle. The determination processor is mounted on the vehicle and configured to be supplied with control information from the processors. To the in-vehicle communication network, the processors and the determination processor are coupled. The control device is configured to establish wireless communication with the vehicle through a network environment, and includes a backup processor configured to hold the control information regarding the vehicle. The determination processor is configured to take a count of unconformities between a sender identifier and a recipient identifier of the control information transmitted and received by the processors through the in-vehicle communication network. When the count of unconformities becomes larger than a predetermined threshold value, the determination processor is configured to determine that an abnormality is present, and transmit an abnormality signal to the control device through the network environment. The control device is configured to, upon receiving the abnormality signal, transmit the control information held by the backup processor, to the vehicle through the network environment, and make a remote control of the vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
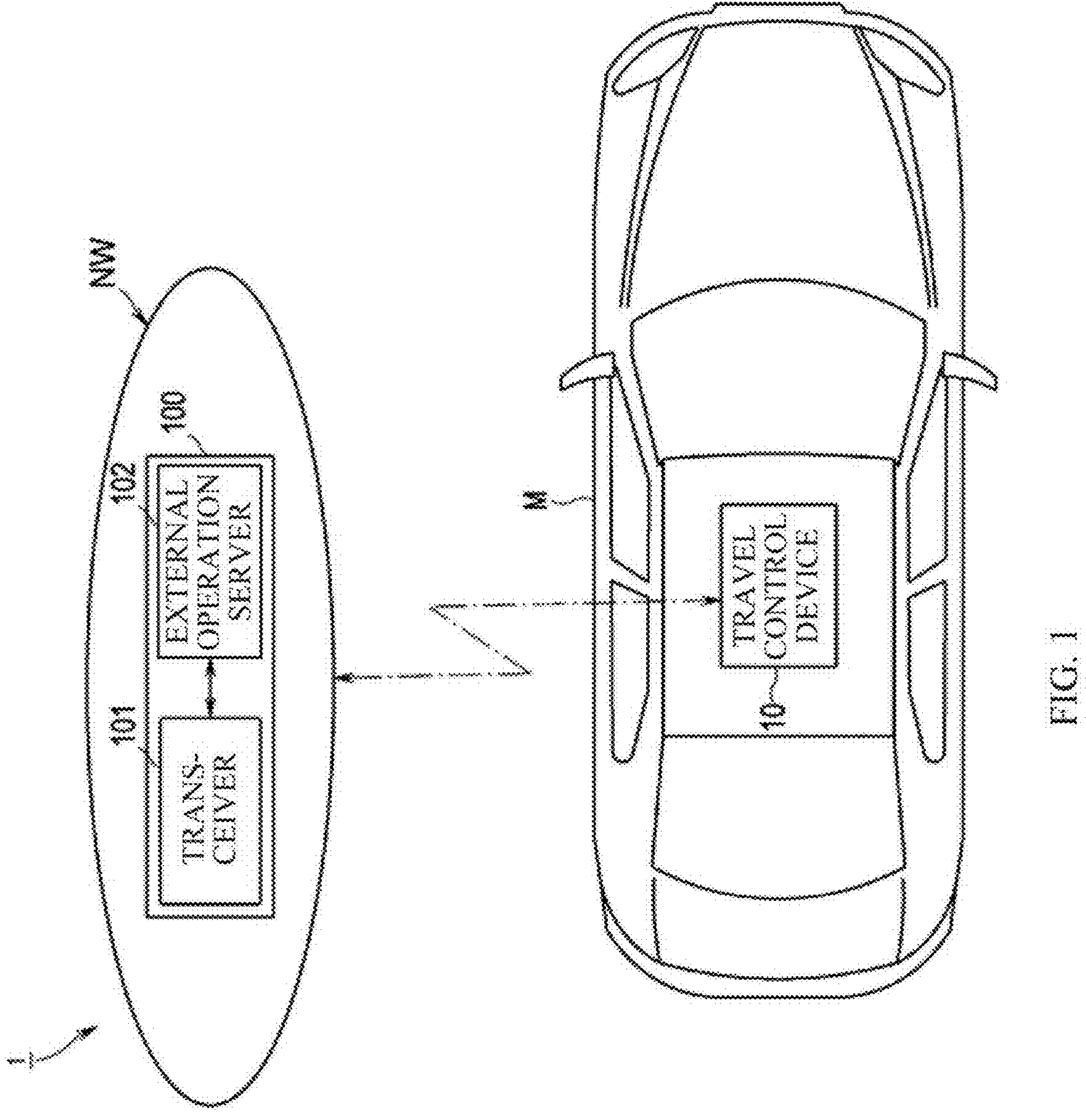
FIG. 1 illustrates a travel control device for a vehicle and a vehicle control device communicating with each other through a network environment, in a travel control system for a vehicle according to an embodiment of the disclosure.

Vehicles coupled to a network environment has possibility that a plurality of ECUs is subjected to an abnormal control because of unauthorized access from outside, e.g., a cyber-attack. In case of takeover of a vehicle from outside, an operation with malicious intention, or the like, there is a limit to defense of the vehicle to be provided by the vehicle itself. This may possibly result in activation of unintended functions of the vehicle.

It is desirable to provide a travel control system for a vehicle that helps to defend the vehicle from activation of unintended functions of the vehicle by unauthorized access from outside.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Figure 2:
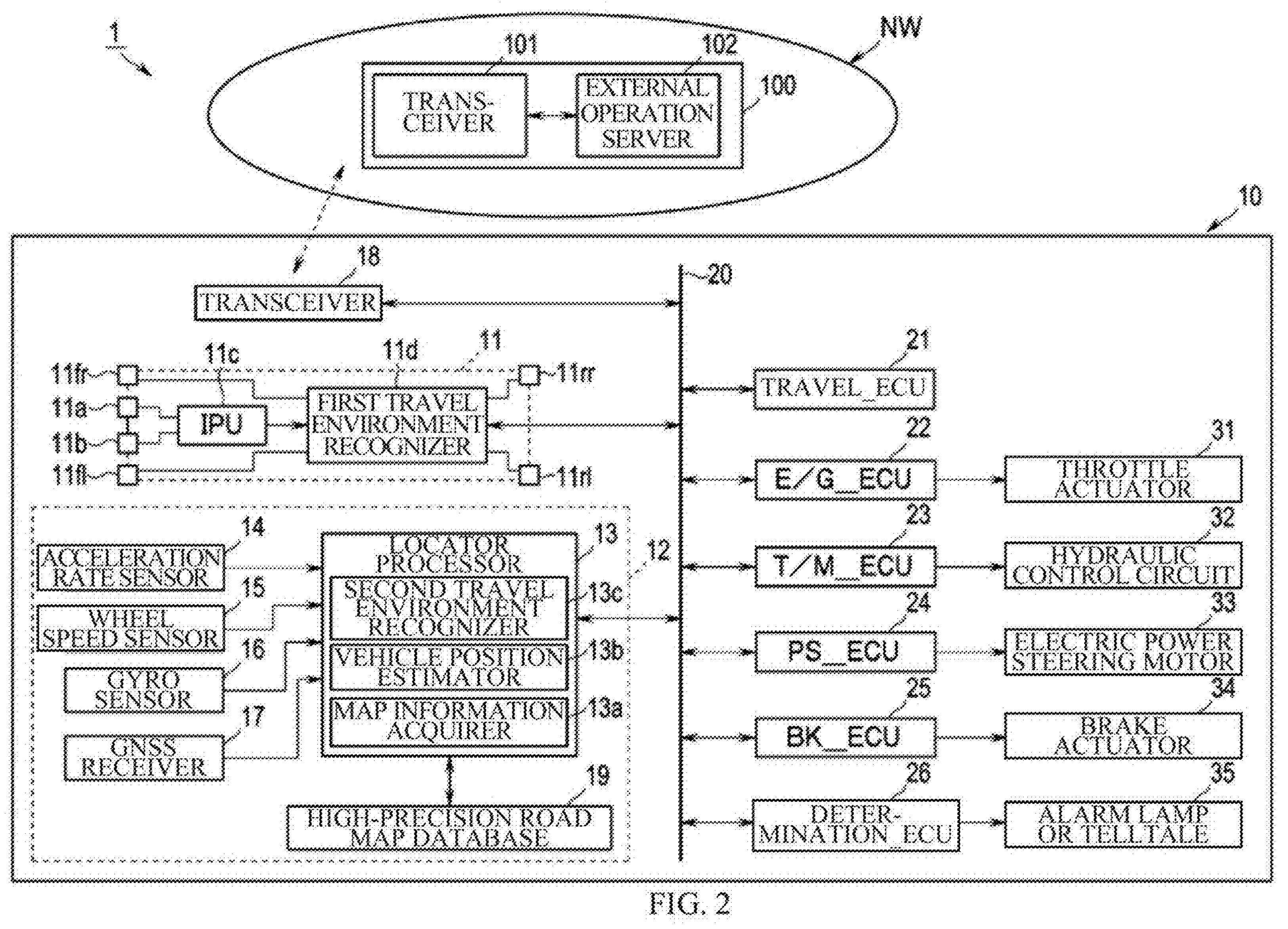
FIG. 2 is a schematic block diagram of a configuration of the travel control system for the vehicle.

FIG. 1 illustrates a travel control device to be mounted on a vehicle, and a vehicle control device. FIG. 2 is a block diagram of an overall configuration of a travel control system for the vehicle.

Referring to FIGS. 1 and 2, a travel control system 1 for a vehicle M according to an embodiment may include a travel control device 10 and a vehicle control device 100. The travel control device 10 may be mounted on the vehicle M. The vehicle control device 100 may be installed in an operation center outside the vehicle. To the vehicle control device 100, the travel control devices 10 mounted on a plurality of the vehicles M may be coupled by wireless communication through a network environment NW. That is, the vehicle M includes a so-called connected car.

The vehicle control device 100 may be coupled to, for example, the network environment NW by cloud computing, edge computing, or the like, or the network environment NW by a road-associated facility network. The vehicle control device 100 may sequentially integrate road map information transmitted from the travel control device 10 of each vehicle M and updates the road map information.

The vehicle control device 100 may transmit the updated road map information to each vehicle M. The vehicle control device 100 may include a transceiver 101 and an external operation server 102. The vehicle control device 100 may be installed in, for example, the operation center for each region.

The external operation server 102 may constitute a road map information integrated system. The external operation server 102 may integrate the road map information collected from the vehicles M through the transceiver 101 coupled to the network environment NW, and sequentially update the road map information surrounding the vehicle M on the road.

The road map information may include, for example, a dynamic map. The road map information may include four layers of information, namely, static information and quasi-static information, and quasi-dynamic information and dynamic information. The static information and the quasi-static information constitute, for example, road information. The quasi-dynamic information and the dynamic information constitute, for example, traffic information.

The static information may include information to be updated within one month, e.g., roads, structures on the roads, lane information, road surface information, and permanent regulation information. The quasi-static information may include information to be updated within one hour, e.g., road construction, traffic restriction information due to events, etc., wide-area weather information, and traffic congestion prediction.

The quasi-dynamic information may include information to be updated within one minute, e.g., an actual congestion state and travel restriction at the time of observation, a temporary state of obstacles to travel such as fallen objects and obstacles, actual states of traffic accidents, and narrow-area weather information.

The dynamic information may include information to be updated within one second, e.g., information to be transmitted or exchanged between moving bodies, information regarding traffic signals currently indicated, information regarding pedestrians and two-wheel vehicles in an intersection, and vehicle information regarding vehicles traveling straight through an intersection.

Such road map information may be retained and updated on cycles of receipt of the next piece of information from each vehicle M. The updated road map information may be transmitted as appropriate to the travel control device 10 of each vehicle M through the transceiver 101.

The travel control device 10 of the vehicle M may include a travel environment recognizer 11 and a locator 12. The travel environment recognizer 11 and the locator 12 are configured to recognize a travel environment outside the vehicle.

The travel control device 10 may include a travel control unit (hereinafter referred to as a "travel_ECU") 21, an engine control unit (hereinafter referred to as an "E/G_ECU") 22, a transmission control unit (hereinafter referred to as a "T/M_ECU") 23, a power steering control unit (hereinafter referred to as a "PS_ECU") 24, a brake control unit (hereinafter referred to as a "BK_ECU") 25, and a determination control unit (hereinafter referred to as a "determination_ECU") 26.

The control units (ECUs) 21 to 26, together with the travel environment recognizer 11 and the locator 12, may be coupled together through a communication bus 20 of an in-vehicle communication network such as a CAN (Controller Area Network).

The travel environment recognizer 11 may be fixed to, for example, an upper center of a front portion of vehicle interior. The travel environment recognizer 11 may include a main camera 11*a*, a sub-camera 11*b*, an image processing unit (IPU) 11*c*, and a first travel environment recognizer 11*d*. The main camera 11*a* and the sub-camera 11*b* may include in-vehicle cameras (stereo cameras) serving as external recognition devices.

The main camera 11*a* and the sub-camera 11*b* may include, for example, autonomous sensors configured to sense a real space in front of the vehicle M. The main camera 11*a* and the sub camera 11*b* may be disposed at, for example, horizontally symmetrical positions with respect to the vehicle-widthwise center and configured to perform stereo imaging of a frontward view of the vehicle M from different viewpoints.

The IPU 11*c* may perform image processing as predetermined on image information regarding a frontward travel environment in front of the vehicle M captured by the main camera 11*a* and the sub-camera 11*b*. The IPU 11*c* may generate the image information regarding the frontward travel environment, i.e., distance image information, including distance information obtained from amounts of displacements between positions of corresponding objects.

The first travel environment recognizer 11*d* may obtain lane lines based on, for example, the distance image information received from the IPU 11*c*. The lane lines define a road around the vehicle. The first travel environment recognizer 11*d* may obtain a road curvature (1/m) of the lane lines and a width between the right and left lane lines, i.e., a lane width. The lane lines define right and left sides of a travel road on which the vehicle is traveling, i.e., a vehicle travel lane.

Various methods to obtain the road curvature and the lane width have been known. For example, the first travel environment recognizer 11*d* may recognize the right and left lane lines by binarization processing of the road curvature by a difference in brightness based on the image information regarding the frontward travel environment. Thus, the first travel environment recognizer 11*d* may obtain, for each predetermined segment, curvatures of the right and left lane lines by, for example, a curve-approximating expression using the least-squares method.

The first travel environment recognizer 11*d* may further perform predetermined pattern matching or the like on the distance image information. The first travel environment recognizer 11*d* may recognize three-dimensional objects such as guardrails and curbstones that are present along the road, and pedestrians, two-wheel vehicles, and other vehicles than the two-wheel vehicles that are present on the road around the vehicle M. The three-dimensional object thus recognized by the main camera 11*a* and the sub-camera 11*b* is referred to as a camera object, or a camera OBJ.

The first travel environment recognizer 11*d* may recognize the kinds of the three-dimensional objects, distances to the three-dimensional objects, speeds of the three-dimensional objects, relative speeds between the three-dimensional objects and the vehicle, and the like. To the first travel environment recognizer 11*d*, a plurality of radar devices may be coupled. The radar devices may include, for example, a right front sideward radar device 11*fr*, a left front sideward radar device 11*fl*, a right rear sideward radar device 11*rr*, and a left rear sideward radar device 11*rl*. The right front sideward radar device 11*fr*, the left front sideward radar device 11*fl*, the right rear sideward radar device 11*rr*, and the left rear sideward radar device 11*rl* may constitute an autonomous sensor.

The right front sideward radar device 11*fr* and the left front sideward radar device 11*fl* may be provided, for example, on right and left sides of a front bumper, respectively. The right front sideward radar device 11*fr* and the left front sideward radar device 11*fl* may monitor, respectively, right and left diagonally frontward and sideward regions of the vehicle M that are unmonitorable by the images from the main camera 11*a* and the sub-camera 11*b* mentioned above. The right front sideward radar device 11*fr* and the left front sideward radar device 11*fl* may be disposed to allow their respective monitoring regions to overlap the regions to be monitored by the main camera 11*a* and the sub-camera 11*b*.

The right rear sideward radar device 11*rr* and the left rear sideward radar device 11*rl* may be provided, for example, on right and left sides of a rear bumper, respectively. The right rear sideward radar device 11*rr* and the left rear sideward radar device 11*rl* may monitor, respectively, right and left sideward and rearward regions of the vehicles M that are unmonitorable by the right front sideward radar device 11*fr* and the left front sideward radar device 11*fl* mentioned above.

The right rear sideward radar device 11*rr* and the left rear sideward radar device 11*rl* may be disposed to allow their respective monitoring regions to overlap each other. The right rear sideward radar device 11*rr* and the left rear sideward radar device 11*rl* may be disposed to allow their respective monitoring regions to overlap the monitoring regions of the right front sideward radar device 11*fr* and the left front sideward radar device 11*fl*.

The radar devices 11*fr*, 11*fl*, 11*rr*, and 11*rl* may include millimeter-wave radar, laser radar, LIDER (Light Detection and Ranging), and the like. The radar devices 11*fr*, 11*fl*, 11*rr*, and 11*rl* may receive reflected waves of horizontally emitted radar waves such as radio waves, laser beams, and the like to detect a plurality of reflection points on the three-dimensional objects present around the vehicle M.

The radar devices 11*fr*, 11*fl*, 11*rr*, and 11*rl* may analyze the relative positions and the speeds of movement of the detected reflection points and perform grouping processing to recognize the three-dimensional objects. The radar devices 11*fr*, 11*fl*, 11*rr*, and 11*rl* may set whichever reflection point has the closest direct distance to the vehicle, out of the reflection points on each of the recognized three-dimensional objects, as a representative point of the relevant three-dimensional object. The three-dimensional object thus recognized by the radar devices 11*fr*, 11*fl*, 11*rr*, and 11*rl* is referred to as a radar object, or a radar OBJ.

Information regarding the radar OBJ thus recognized by the radar devices 11*fr*, 11*fl*, 11*rr*, and 11*rl* such as the representative point may be inputted to the first travel environment recognizer 11*d*. This helps the first travel environment recognizer 11*d* to recognize not only a preceding vehicle present in front of the vehicle M, and the like but also a parallel traveling vehicle present sideward of the vehicle M, an intersecting vehicle approaching the vehicle M in a direction intersecting a travel route of the subject vehicle in an intersection, etc., a following vehicle present behind the vehicle M, and the like.

The first travel environment recognizer 11*d* may convert the recognized positions of the camera OBJs and the radar OBJs into, for example, coordinates on an orthogonal coordinate system with the center of the vehicle M as an origin. In the orthogonal coordinate system, a longitudinal direction of the vehicle is assumed to be a Z-axis and a vehicle widthwise direction of the vehicle is assumed to be an X-axis.

The first travel environment recognizer 11*d* may compare the camera OBJ to the radar OBJ. The first travel environment recognizer 11*d* may recognize a combination of the camera OBJ and the radar OBJ matching with each other based on a preset condition, as a fusion object, or a fusion OBJ. In the following description, any information recognized by the first travel environment recognizer 11*d* is referred to as first travel environment information.

The locator 12 may estimate a position of the subject vehicle on a road map. The locator 12 may include a locator processor 13. The locator processor 13 is configured to estimate the position of the subject vehicle. To input side of the locator processor 13, sensors to be involved in estimating the position of the vehicle M, i.e., the position of the subject vehicle, may be coupled. Non-limiting examples of the sensors may include a longitudinal acceleration rate sensor 14, a wheel speed sensor 15, a gyro sensor 16, and a GNSS receiver 17.

The longitudinal acceleration rate sensor 14 may detect a longitudinal acceleration rate of the vehicle M. The wheel speed sensor 15 may detect rotational speeds of a right front wheel, a left front wheel, a right rear wheel, and a left rear wheel. The gyro sensor 16 may detect an angular velocity or an angular acceleration rate of the vehicle M. The GNSS receiver 17 may receive positioning signals transmitted from a plurality of positioning satellites.

The travel control device 10 may include a transceiver 18. The transceiver 18 is configured to transmit and receive information to and from the vehicle control device 100. The transceiver 18 may be coupled to the travel environment recognizer 11, the locator 12, and the control units (ECUs) 21 to 25 through the communication bus 20 of the in-vehicle communication network.

Furthermore, to the locator processor 13, a high-precision road map database 19 may be coupled. The high-precision road map database 19 may include a mass storage medium such as an HDD (Hard Disk Drive). The high-precision road map database 19 may hold high-precision road map information, i.e., a dynamic map.

The high-precision road map information may include, for example, similar information to the road map information to be sequentially updated in the external operation server 102, as the information to be involved in making a travel control of the vehicle M. That is, the high-precision road map information may include the four layers of information, namely, the static information and the quasi-static information that constitute, for example, the road information, and the quasi-dynamic information and the dynamic information that constitute, for example, traffic information.

The locator processor 13 may include a map information acquirer 13*a*, a vehicle position estimator 13*b*, and a second travel environment recognizer 13*c*. The map information acquirer 13*a* may acquire, based on, for example, a destination set by a driver on the occasion of automated driving, route map information from a current location to the destination, from the high-precision road map information held in the high-precision road map database 19.

The map information acquirer 13*a* may transmit the acquired route map information, i.e., lane data on a route map, to the vehicle position estimator 13*b*. The vehicle position estimator 13*b* may acquire positional coordinates of the vehicle M based on the positioning signals received by the GNSS receiver 17.

The vehicle position estimator 13*b* may perform map matching of the acquired positional coordinates onto the route map information. The vehicle position estimator 13*b* may estimate the position of the subject vehicle on the road map and recognize the right and left lane lines that define the travel road of the subject vehicle, i.e., the travel lane. In this way, the vehicle position estimator 13*b* may acquire a road curvature of a centerline of the travel lane held in the high-precision road map database 19.

The vehicle position estimator 13*b* may switch to autonomous navigation to estimate the position of the subject vehicle, in an environment in which lowered sensitivity of the GNSS receiver 17 inhibits receipt of the valid positioning signals from the positioning satellites, e.g., when the vehicle is traveling in a tunnel, and estimate the position of the vehicle on the road map.

That is, the vehicle position estimator 13*b* may estimate the position of the subject vehicle on the road map, from the vehicle speed obtained based on the wheel speed detected by the wheel speed sensor 15, the angular velocity detected by the gyro sensor 16, and the longitudinal acceleration rate detected by the longitudinal acceleration rate sensor 14. The vehicle position estimator 13*b* may determine, based on the estimated position of the subject vehicle on the road map, the kind of the road, etc. of the travel road on which the vehicle Mis traveling.

The second travel environment recognizer 13*c* may update the high-precision road map information held in the high-precision road map database 19 to the latest state using the road map information acquired by external communication through the transceiver 18, e.g., road-to-vehicle communication and vehicle-to-vehicle communication. The information update may be made with respect to not only the static information but also the quasi-static information, the quasi-dynamic information, and the dynamic information.

Thus, the road map information may include the road information and the traffic information acquired by the communication with the outside of the vehicle. Accordingly, in the road map information, information regarding moving bodies such as surrounding vehicles traveling on the road may be updated substantially in real time.

The second travel environment recognizer 13*c* may verify the high-precision road map information based on the first travel environment information recognized by the first travel environment recognizer 11*d* of the travel environment recognizer 11. The second travel environment recognizer 13*c* may update the high-precision road map information held in the high-precision road map database 19 to the latest state. The information update may be made with respect to not only the static information but also the quasi-static information, the quasi-dynamic information, and the dynamic information.

Thus, the information regarding the moving bodies such as the surrounding vehicles traveling on the road recognized by the first travel environment recognizer 11*d* of the travel environment recognizer 11 may be updated in real time. The high-precision road map information thus updated may be transmitted to the vehicle control device 100, the surrounding vehicles around the vehicle M, and the like through the network environment NW by the road-to-vehicle communication, the vehicle-to-vehicle communication, and the like through the transceiver 18.

The second travel environment recognizer 13*c* may recognize, as second travel environment information, the road map information regarding a set range centered on the position of the subject vehicle estimated by the vehicle position estimator 13*b*, within the updated high-precision road map information.

The range of the second travel environment information to be recognized by the second travel environment recognizer 13*c* may be wider than that of the first travel environment information to be recognized by the first travel environment recognizer 11*d*. The second travel environment recognizer 13*c* may recognize, for example, the road map information regarding a range of a radius of 1 km centered on the position of the subject vehicle, as the second travel environment information.

The travel_ECU 21 may read the first travel environment information recognized by the first travel environment recognizer 11*d* of the travel environment recognizer 11, the second travel environment information recognized by the second travel environment recognizer 13*c* of the locator 12, and the like.

To input side of the travel_ECU 21, various unillustrated switches and sensors may be coupled. Non-limiting examples of the switches and the sensors may include a mode changeover switch, a steering torque sensor, a brake sensor, an accelerator sensor, and a yaw rate sensor. The accelerator sensor may detect an amount of stepping down of an accelerator pedal as an amount of a driving operation by the driver.

The mode changeover switch may allow the driver to make a changeover between, for example, turning on and off the automated driving, or the travel control. The steering torque sensor may detect steering torque as the amount of the driving operation by the driver. The brake sensor may detect an amount of stepping down of a brake pedal as the amount of the driving operation by the driver. The yaw rate sensor may detect a yaw rate acting on the vehicle.

In the travel_ECU 21, setting of driving modes may be provided. The driving modes may include a manual driving mode, a first travel control mode and a second travel control mode, and an evacuation mode. The first travel control mode and the second travel control mode may be modes for the travel control. The travel_ECU 21 is configured to selectively switch between these driving modes based on an operation state or the like with respect to the mode changeover switch.

The manual driving mode may be a driving mode that involves steering by the driver. The manual driving mode may be a driving mode including allowing the vehicle to travel in accordance with, for example, the driving operations by the driver, e.g., a steering operation, an accelerator operation, and a brake operation.

Similarly, the first travel control mode may be a driving mode that involves steering by the driver. That is, the first travel control mode may be performed by appropriately combining, for example, an adaptive cruise control (ACC), an active lane keep control (ALKC), and an active lane keep bouncing (Active Lane Keep Bouncing) control, through a control of the E/G_ECU 22, the PS_ECU 24, the BK_ECU 25, and the like, while reflecting the driving operation by the driver. Thus, the first travel control mode may be a semi-automated driving mode including allowing the vehicle M to travel along a target travel route.

The second travel control mode may be performed by, for example, appropriately combining the ACC control, the ALKC control, and the ALKB control through the control of the E/G_ECU 22, the PS_ECU 24, the BK_ECU 25, and the like without involving the steering, the accelerator operation, and the braking operation by the driver. Thus, the second travel control mode may be an automated driving mode including allowing the vehicle M to travel in accordance with a target route, or the route map information.

The evacuation mode may be, for example, a mode including making the vehicle M stop automatically in an evacuation area, e.g., on a roadside strip or the like, in a case where the vehicle is traveling in the second travel control mode, when the vehicle fails in keeping on traveling by the second travel control mode and fails in allowing the driver to take over the driving operation, i.e., when the vehicle M fails in making transitions to the manual driving mode or the first travel control mode.

To output side of the E/G_ECU 22, a throttle actuator 31 may be coupled. The throttle actuator 31 may open and close a throttle valve of an electronically controlled throttle provided in a throttle body of an engine. The throttle actuator 31 may open and close the throttle valve by a driving signal from the E/G_ECU 22 to adjust a flow rate of the intake air, and thereby generate a desired engine output.

To output side of the T/M_ECU 23, a hydraulic control circuit 32 may be coupled. To input side of the T/M_ECU 23, various unillustrated sensors such as a shift position sensor may be coupled. The T/M_ECU 23 may make a hydraulic control of the hydraulic control circuit 32 based on a signal of engine torque estimated by the E/G_ECU 22, detection signals from the various sensors, and the like.

Thus, the T/M_ECU 23 may cause a friction engagement element, a pulley, or the like to operate. The friction engagement element, the pulley, or the like are provided in an automatic transmission. In this way, the T/M_ECU 23 may perform shifting of the engine output at a desired shifting ratio. The T/M_ECU 23 may output, to the travel_ECU 21, a signal of a shift position or the like detected by the various sensors.

To output side of the PS_ECU 24, an electric power steering motor 33 may be coupled. The electric power steering motor 33 serves as a driving source. The electric power steering motor 33 may apply steering torque to a steering mechanism by a motor rotational force. In the automated driving, the electric power steering motor 33 may control the electric power steering motor 33 for operation, by a driving signal from the PS_ECU 24.

Thus, the ALKC control and a lane change control are performed. The ALKC control includes allowing the vehicle M to keep on traveling on the current travel lane. The lane change control includes allowing the vehicle M to make a lane change to an adjacent lane for an overtaking control or the like.

To output side of the BK_ECU 25, a brake actuator 34 may be coupled. The brake actuator 34 may adjust pressure of brake oil to be supplied to a brake wheel cylinder provided on each wheel.

The brake actuator 34 may be driven by a driving signal from the BK_ECU 25. The brake actuator 34 may generate a braking force of a braking mechanism for each wheel by the brake wheel cylinder, causing compulsive deceleration of the vehicle.

To output side of the determination_ECU 26, an alarm lamp 35 may be coupled. The alarm lamp 35 may include, for example, a telltale provided in an instrument panel and configured to notify an abnormality.

Figure 3:
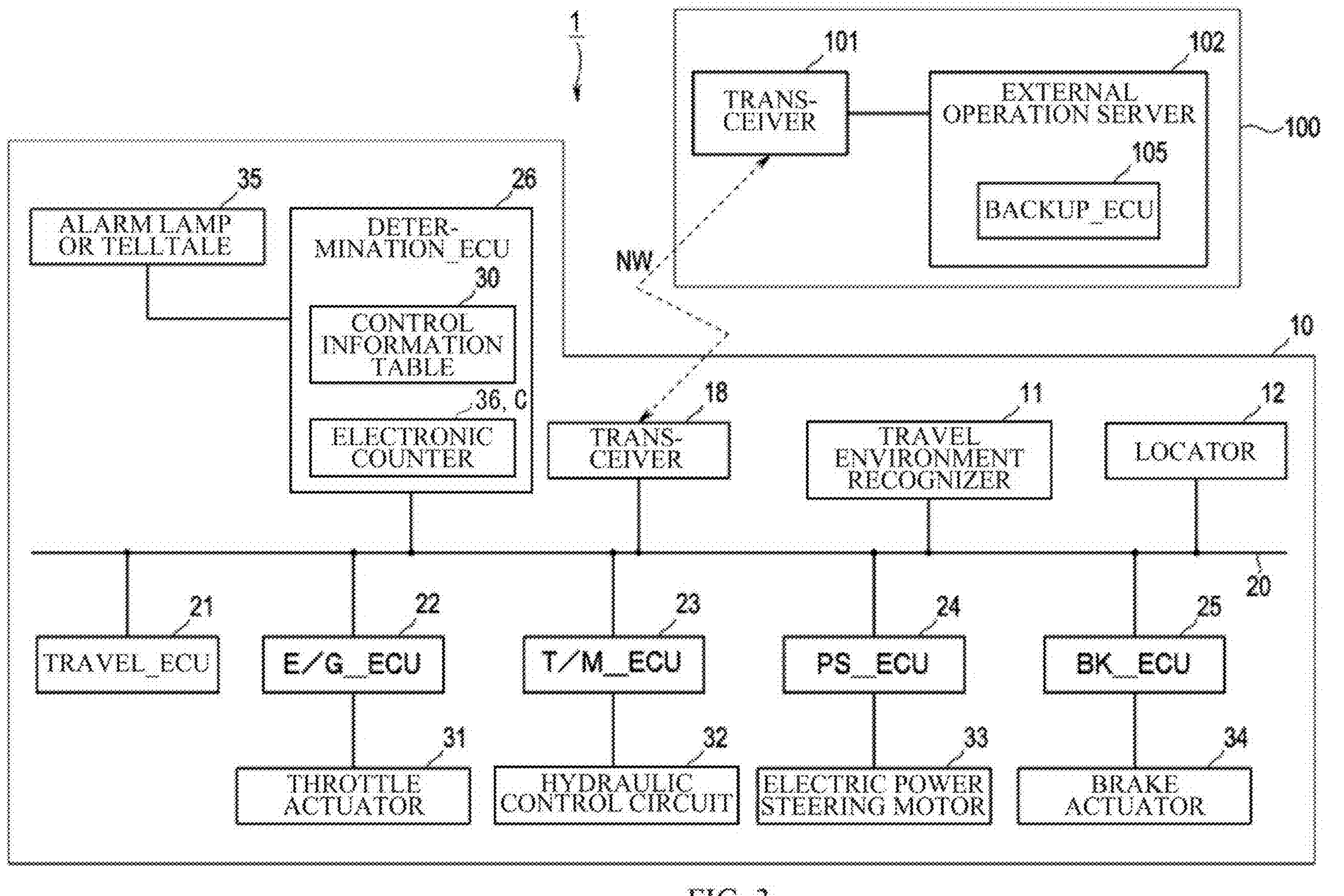
FIG. 3 is a block diagram of the configuration of the travel control system for the vehicle.

As illustrated in FIG. 3, the determination_ECU 26 may hold a control information table 30 in an internal memory. The control information table 30 may hold data regarding a normal piece of the control information to which an identifier (ID) corresponding to a sender ID that identifies the control information is attached. The normal piece of the control information means a frame including data to which the same ID as the sender ID or a recipient ID that identifies the control information when the control units 21 to 25 transmit and receive the control information is attached.

Figure 4:
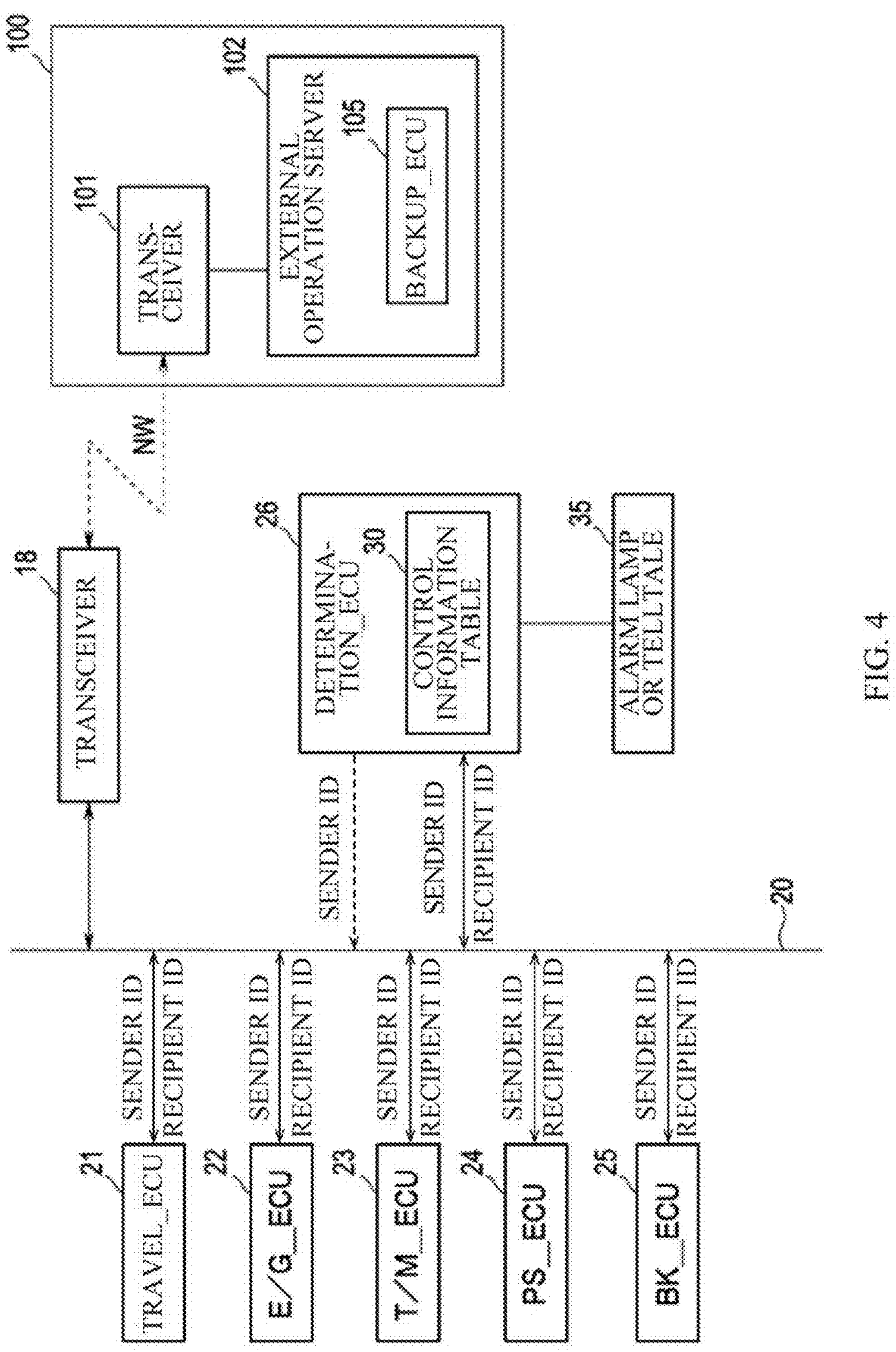
FIG. 4 is a schematic block diagram of ECUs, a determination ECU, an alarm lamp, a transceiver, and the vehicle control device performing transmission and receipt through a communication bus of an in-vehicle communication network.

As illustrated in FIG. 4, the determination_ECU 26 may be supplied with the control information, i.e., data frames. The control information means various signals to be transmitted and received by the control units 21 to 25 to or from one another through the communication bus 20 of the in-vehicle communication network. The determination_ECU 26 may determine whether the sender ID, the recipient ID, and data contents of the control information are normal. The sender ID identifies the control information inputted. The recipient ID identifies receipt of the control information.

The control units 21 to 25 on sender side may each transmit the control information identified by the sender ID, to the other control units 21 to 25 and the determination_ECU 26. The control units 21 to 25 on recipient side may receive a necessary piece of the control information, and transmit the recipient IDs that conform to the sender ID, to the control units 21 to 25 on the sender side and the determination_ECU 26.

The vehicle control device 100 may include a backup control unit (hereinafter, referred to as a "backup_ECU") 105 in the external operation server 102. The backup_ECU 105 may also hold the normal piece of the control information related to the travel control of the vehicle M and including the normal identifier (ID) and the normal data.

The vehicle control device 100 is configured to, upon receiving a signal notifying an abnormality from the travel control device 10 of the vehicle M through the network environment NW by the wireless communication, make a remote control of the vehicle M based on the normal piece of the control information. At this occasion, for example, the vehicle control device 100 may perform the evacuation mode by the remote control, to make the vehicle M stop automatically in the evacuation area, e.g., on the roadside strip or the like.

When the vehicle M has an abnormality, the vehicle control device 100 may move the vehicle M by the remote control to any place that serves as the evacuation area such as a nearby gas station or a parking lot of a shop. When the vehicle M has the setting of the destination, the vehicle control device 100 may perform, by the remote control, the second travel control mode including allowing the vehicle M to travel following the target route.

Description is given of a security system configured to provide protection against an abnormal control because of unauthorized access to the in-vehicle communication network by a cyber-attack, etc. from the outside, by the travel control system 1 of the vehicle M according to the embodiment.

Figure 5:
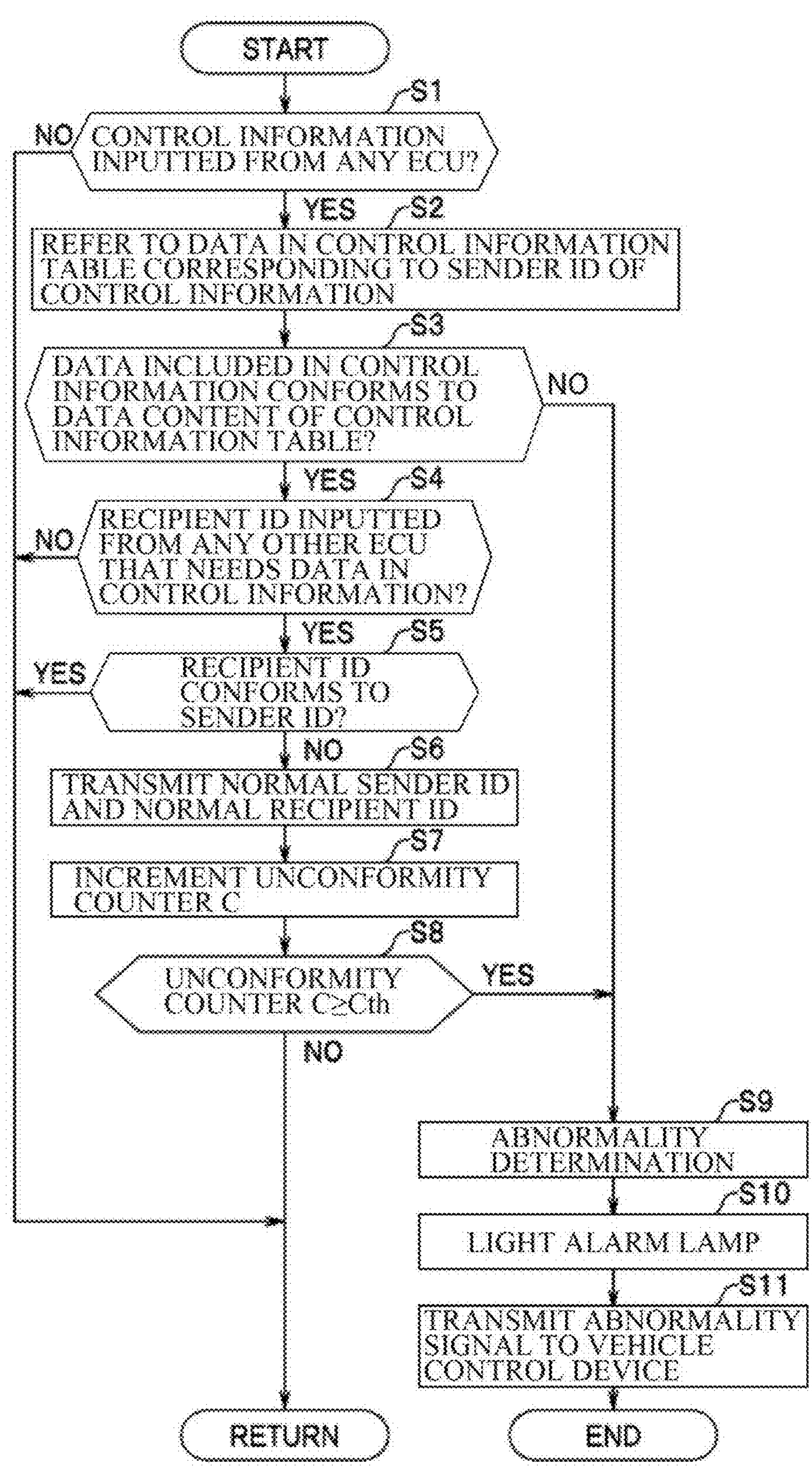
FIG. 5 is a flowchart to be executed by the determination ECU of the travel control device for the vehicle.

In the travel control device 10 mounted on the vehicle M, when the control units 21 to 25 are in operation, a control routine in the flowchart in FIG. 5 may be performed by the determination_ECU 26.

The determination_ECU 26 may determine whether the control information has been inputted from any one of the control units (ECUs) 21 to 25 (step S1). The control information outputted from any one of the control units 21 to 25 may be inputted to the other control units 21 to 25 and the determination_ECU 26 through the communication bus 20 of the in-vehicle communication network. That is, any one of the control units 21 to 25 that outputs the control information is a node on the sender side.

When the control information is inputted (step S1: YES), the determination_ECU 26 may refer to the control information table 30 for the data corresponding to the sender ID that identifies the inputted control information (step S2). In step S2, the determination_ECU 26 may refer to the control information table 30 for a data content to which the same identifier (ID) as the sender ID of the inputted control information is attached. When no control information has been inputted (step S1: NO), the determination_ECU 26 may repeat the process in step S1.

The determination_ECU 26 may determine whether the data included in the inputted control information conforms to the data content of the control information table 30 (step S3). In step S3, the determination_ECU 26 may compare the data included in the control information identified by the sender ID to the data content having the conforming ID and obtained by referring to the control information table 30.

When the data included in the control information conforms to the data content of the control information table 30 (step S3: YES), the determination_ECU 26 may determine whether the recipient ID has been inputted from any one of the other control units (ECU) 21 to 25 that needs the control information having the sender ID (step S4). At this occasion, the determination_ECU 26 may determine that the data in the control information inputted from any one of the control units (ECUs) 21 to 25 on the sender side is normal.

When the data in the inputted control information and the data in the control information table 30 do not conform to each other (step S3: NO), the determination_ECU 26 may determine that the data in the control information is not normal, and the flow may proceed to a process of an abnormality determination in step S9 described later.

The recipient ID outputted from any one of the other control units 21 to 25 may be inputted to any one of the control units 21 to 25 on the sender side and the determination_ECU 26 through the communication bus 20 of the in-vehicle communication network. That is, any one of the other control units 21 to 25 that outputs the recipient ID is a node on the recipient side.

When the recipient ID has been inputted (step S4: YES), the determination_ECU 26 may determine whether the recipient ID conforms to the sender ID (step S5). In step S5, the determination_ECU 26 may determine whether the inputted recipient ID conforms to the sender ID of the control information.

When the recipient ID conforms to the sender ID (step S5: YES), the flow may return to step S1 and the determination_ECU 26 may repeat the subsequent processing. At this occasion, the determination_ECU 26 may determine that the situation is normal in which the recipient ID of any one of the other control units (ECU) 21 to 25 on the recipient side conforms to the sender ID of the control information. That is, the determination_ECU 26 may determine that the situation is normal without unauthorized access to the in-vehicle communication network because of a cyber-attack, etc. from the outside.

When the sender ID and the recipient ID do not conform to each other (step S5: NO), the determination_ECU 26 may transmit the normal sender ID and the normal recipient IDs of the control information (step S6) and increment unconformity counter C (step S7). As illustrated in FIG. 3, the determination_ECU 26 may include an electronic counter 36 that serves as the unconformity counter C configured to count the number of unconformities.

At this occasion, the determination_ECU 26 may determine, in the determination process in step S3, that the data in the control information inputted from any one of the control units (ECU) 21 to 25 on the sender side is normal, but an error has occurred in which the recipient ID of any one of the other control units (ECUs) 21 to 25 that needs the control information does not conform to the sender ID.

Thus, the determination_ECU 26 may transmit the normal sender ID and the normal recipient ID of the control information to the control units (ECU) 21 to 25 through the communication bus 20 of the in-vehicle communication network. Thereafter, the determination_ECU 26 may determine whether the unconformity counter C is equal to or larger than a predetermined threshold value Cth ($C \geq Cth$) (step S8). The predetermined threshold value Cth may be set to any value, for example, from 8 to 12 both inclusive. When the unconformity counter C is smaller than the predetermined threshold value Cth ($C < Cth$) (step S8: NO), the flow may return to step S1, and the determination_ECU 26 may repeat the subsequent processing.

As described, the determination_ECU 26 may increment the unconformity counter C when the sender ID and the recipient ID of the control information do not conform to each other in the control units (ECU) 21 to 25. When the unconformity counter Cis smaller than the predetermined threshold value Cth ($C < Cth$), the determination_ECU 26 may determine that the control units (ECU) 21 to 25 are in an insignificant error condition.

When the unconformity counter C is larger than the predetermined threshold value Cth (step S8: YES), the determination_ECU 26 may make the abnormality determination (step S9) and light the alarm lamp 35 (step S10). The determination_ECU 26 may also make the abnormality determination (step S9) and light the alarm lamp 35 (step S10) when the control information is not normal in step S3 (step S3: NO).

When the unconformity counter C is equal to or larger than the predetermined threshold value Cth ($C \geq Cth$), the determination_ECU 26 may determine that the control units (ECUs) 21 to 25 are in a seriously abnormal condition, such as unauthorized access to the in-vehicle communication network because of a cyber-attack, etc. from the outside.

That is, the determination_ECU 26 may determine that an abnormality continues because of a cyber-attack, etc. from the outside in which the data in the control information from any one of the control units (ECUs) 21 to 25 on the sender side or the sender ID has been rewritten or any one of the other control units (ECUs) 21 to 25 on the recipient side receives data in a wrong piece of the control information and outputs the sender ID.

The determination_ECU 26 may transmit an abnormality signal to the vehicle control device 100 (step S11). The determination_ECU 26 may output the abnormality signal to the communication bus 20 of the in-vehicle communication network. The abnormality signal may be transmitted wirelessly to the transceiver 101 of the vehicle control device 100 from the transceiver 18 of the travel control device 10 through the network environment NW.

Figure 6:
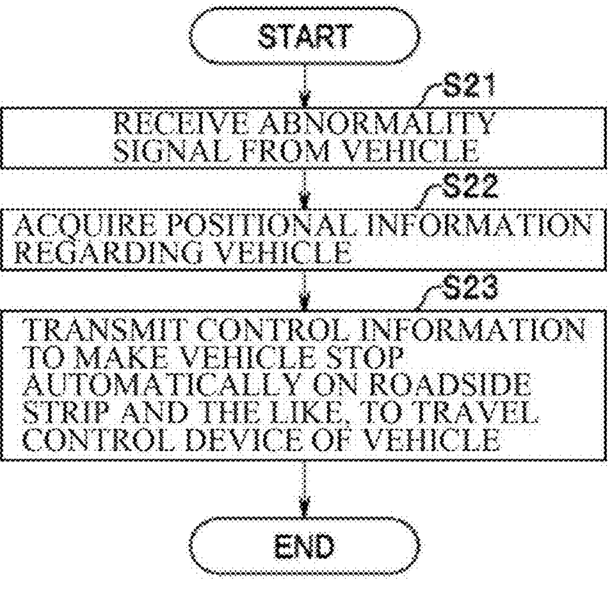
FIG. 6 is a flowchart to be executed by the vehicle control device upon receiving an abnormality signal.

Thereupon, the vehicle control device 100 may perform a control routine in the flowchart in FIG. 6. The vehicle control device 100 may receive the abnormality signal from the vehicle M (step S21). The vehicle control device 100 may allow the transceiver 101 to receive, through the network environment NW, the abnormality signal transmitted from the travel control device 10 of the vehicle M. The abnormality signal may be inputted to the external operation server 102.

When the abnormality signal is inputted to the external operation server 102, the vehicle control device 100 may acquire positional information regarding the vehicle M (step S22). The vehicle control device 100 may acquire, through the network environment NW, the positional information regarding the vehicle M based on the positional coordinates transmitted from the travel control device 10 of the vehicle M.

The vehicle control device 100 may transmit the control information to make the vehicle M automatically stop in the evacuation area, e.g., on the roadside strip or the like, to the travel control device 10 of the vehicle M (step S23). The vehicle control device 100 may read the normal piece of the control information including the normal ID and the normal data content from the backup_ECU 105 of the external operation server 102 that holds the normal piece of the control information. The vehicle control device 100 may transmit, to the travel control device 10 of the vehicle M through the network environment NW, the control information including performing the evacuation mode to make the vehicle M stop automatically in the evacuation area, e.g., on the roadside strip or the like, based on the acquired positional information regarding the vehicle M.

In this way, in the vehicle M, the control information is inputted to the travel control device 10 from the vehicle control device 100 through the network environment NW, and the remote control is made to perform the evacuation mode and to make the vehicle M stop automatically in the evacuation area, e.g., on the roadside strip or the like. The vehicle control device 100 may transmit, to the travel control device 10 through the network environment NW, the control information including moving the vehicle M to any place that serves as the evacuation area such as a nearby gas station or a parking lot of a shop, based on the positional information regarding the vehicle M, and make the remote control of the vehicle M. Furthermore, when the vehicle M has the setting of the destination, the vehicle control device 100 may transmit the control information including performing the second travel control mode, to the travel control device 10 through the network environment NW and make the remote control of the vehicle M. The second travel control mode includes allowing the vehicle M to travel to the destination in accordance with the target route.

As described above, the travel control system 1 for the vehicle M of the embodiment determines, by the determination_ECU 26 of the travel control device 10, whether the sender ID and the data content of the control information regarding any one of the control units (ECU) 21 to 25 on the sender side, and the recipient ID of any one of the other control units (ECU) 21 to 25 on the recipient side are normal. Thus, the travel control system 1 of the vehicle M of the embodiment attains to suppress takeover of the vehicle M and an operation with malicious intention because of access from the outside. The determination_ECU 26 counts the number of unconformities, or errors, in the sender IDs and the recipient IDs of the control units (ECU) 21 to 25.

The determination_ECU 26 determines that the abnormality is present, when the unconformity counter C is equal to or larger than the predetermined threshold value Cth (C≥Cth) with the repeated unconformities, or errors, in the sender IDs and the recipient IDs. The determination_ECU 26 may also determine that the abnormality is present, when the data content of the control information regarding any one of the control units (ECUs) 21 to 25 on the sender side does not conform to the data content of the control information table 30.

In the travel control system for the vehicle M, when the determination_ECU 26 determines that the abnormality is present, the travel control device 10 may establish the wireless communication with the vehicle control device 100 installed in the external operation center, through the network environment NW. The vehicle control device 100 makes the remote control of the vehicle M to protect the vehicle M against activation of an unintended function.

As described above, the travel control system 1 for the vehicle M helps to provide the protection against the activation of the unintended function because of unauthorized access such as a cyber-attack from the outside. Hence, it is possible for the vehicle M to suppress takeover of the vehicle from the outside, an operation with malicious intention, and the like.

The control units (ECUs) 21 to 26 and the vehicle control device 100 may include a processor including a CPU (Central Processing Unit), a storage such as a ROM (Read Only Memory), a RAM (Random Access Memory), and the like. The configuration of all or a part of the plurality of circuits of the processor may be provided by software. For example, the CPU may read various programs held in the ROM and execute the program corresponding to the processing. Furthermore, all or a part of the processing by the processor may be provided by a logical circuit or an analog circuit, or the processing by the various programs may be realized by an electronic circuit such as an FPGA.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof. Each of the forgoing embodiments includes inventions at various stages, and various inventions may be extracted by appropriate combinations of a plurality of disclosed constituent elements.

For example, even if some constituent elements are deleted from all the constituent elements described in the embodiments, a configuration from which the constituent elements are deleted may be extracted as an invention as long as the issues described herein are solved and the effects described herein are produced.

The control units (ECUs) 21 to 26 and the vehicle control device 100 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control units (ECUs) 21 to 26 and the vehicle control device 100. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the control units (ECUs) 21 to 26 and the vehicle control device 100 illustrated in FIG. 1.

The invention claimed is:

1. A travel control system for a vehicle, the travel control system comprising:

a plurality of processors mounted on the vehicle;

a determination processor mounted on the vehicle and configured to be supplied with control information from the processors;

an in-vehicle communication network to which the processors and the determination processor are coupled; and a control device configured to establish wireless communication with the vehicle through a network environment, and comprising a backup processor configured to hold the control information regarding the vehicle, the determination processor being configured to take a count of unconformities between a sender identifier and a recipient identifier of the control information transmitted and received by the processors through the in-vehicle communication network, and when the count of unconformities becomes larger than a predetermined threshold value, determine that an abnormality is present, and transmit an abnormality signal to the control device through the network environment, and the control device being configured to, upon receiving the abnormality signal, transmit the control information held by the backup processor, to the vehicle through the network environment, and make a remote control of the vehicle.

2. The travel control system for the vehicle according to claim 1, wherein the determination processor comprises a control information table that holds the control information, and the determination processor is configured to, refer to a data content of the control information table, and when data in the control information transmitted by the processors fails in conforming to the data content of the control information table, determine that the abnormality is present, and transmit the abnormality signal to the control device.

3. The travel control system for the vehicle according to claim 1, further comprising an alarm lamp, wherein the determination processor is configured to light the alarm lamp, when determining that the abnormality is present in the control information.

4. The travel control system for the vehicle according to claim 2, further comprising an alarm lamp, wherein the determination processor is configured to light the alarm lamp, when determining that the abnormality is present in the control information.

5. The travel control system for the vehicle according to claim 1, wherein the control device is configured to, upon receiving the abnormality signal, perform an evacuation mode by the remote control, the evacuation mode including making the vehicle stop automatically in an evacuation area.

6. The travel control system for the vehicle according to claim 2, wherein the control device is configured to, upon receiving the abnormality signal, perform an evacuation mode by the remote control, the evacuation mode including making the vehicle stop automatically in an evacuation area.

* * * * *